March 19, 1963 HUNG CHI CHANG 3,082,126

PRODUCING DIFFUSED JUNCTIONS IN SILICON CARBIDE

Filed June 19, 1959

INVENTOR
HUNG CHI CHANG

BY

Frederick Shapoe

ATTORNEY

United States Patent Office 3,082,126
Patented Mar. 19, 1963

3,082,126

PRODUCING DIFFUSED JUNCTIONS IN SILICON CARBIDE

Hung Chi Chang, Pittsburgh, Pa., assignor to Westinghouse Electric Corporation, East Pittsburgh, Pa., a corporation of Pennsylvania Filed June 19, 1959, Ser. No. 821,566
5 Claims. (Cl. 148—1.5)

This invention relates to the production of diffused junctions in silicon carbide single crystals.

The diffusion of significant conductivity impurities into doped semiconductor materials such, for example, as silicon and germanium, to produce p-n junctions is an established practice in commercial applications. The methods of application of such impurities include solid, liquid, and vapor phase techniques. As new materials are recognized and applied to semiconductor uses, it is natural to attempt to apply techniques developed for earlier materials to the production of p-n junctions in the newer semiconductor materials.

One relatively new material that is gaining recognition for semiconductor applications is silicon carbide. This material is capable of use at temperatures far beyond those for silicon and germanium devices. Upon attempting to apply the diffusion techniques already known to silicon carbide single crystals, it at once becomes apparent that new techniques are needed. Appreciable diffusion occurs in silicon carbide only at very high temperatures, for example 1400° to 2000° C. or more, the particular temperature being determined by the significant conductivity impurity involved along with such other factors as the quality of the single crystal and the like. Silicon carbide decomposes at these temperatures, the rate of decomposition increasing as higher temperatures are approached. It is also relatively inert, chemically, and does not melt without decomposing under normal conditions. Therefore, it is evident that conductivity impurities cannot be provided in a silicon carbide crystal by introducing those impurities to liquid phase silicon carbide while growing a crystal from the melt.

It is, therefore, a primary object of the present invention to provide a process whereby a significant conductivity impurity may be diffused into a silicon carbide single crystal thereby to produce in the crystal a p-n junction while suppressing decomposition of silicon carbide.

It is a further object of the invention to provide techniques whereby p-n junctions can be produced in doped silicon carbide single crystals by use of gaseous, liquid or solid phase diffusants.

These and other objects are attained in accordance with the discovery that diffusion can be made to occur in silicon carbide without deleterious decomposition of the crystal under certain controlled conditions. By bringing a conductivity impurity into contact with a silicon carbide crystal in the presence of a material capable of producing a condition that suppresses or prevents deleterious decomposition of the crystal, at predetermined conditions of crystal temperature and impurity concentration, diffusion can be accomplished. In that general manner, all as more fully explained hereinafter, crystals with p-n junctions, or with p-n-p or n-p-n junctions or the like can be produced as desired.

The invention will be most easily understood upon considering its description in conjunction with typical systems in which it can be practiced. Therefore, the invention will be described further in connection with the appended drawings in which.

Figure 1:
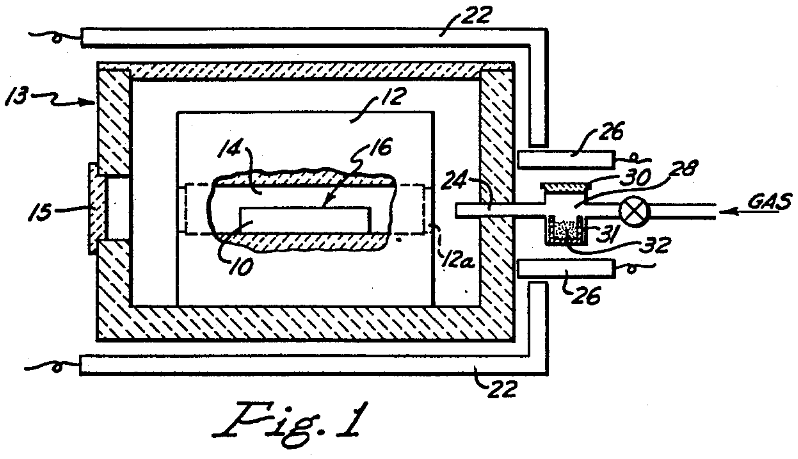
FIG. 1 shows, diagrammatically, a system whereby gaseous diffusion can be practiced to produce a junction-containing silicon carbide single crystal.

Gaseous diffusion in accordance with this invention can be conducted with the system shown in FIG. 1. Referring now to that figure, a doped silicon carbide single crystal 10 in which a junction is to be provided is placed within a mass 12 of a silicon and carbon containing material disposed in a furnace 13. The mass 12 can be silicon carbide granules or powder, or a mixture of silicon and carbon, or a mixture of silicon and silicon carbide, or the like. Those powders can be compressed to a shaped mass for convenient insertion and withdrawal. The single crystal can be placed on a special rack (not shown) provided to support it or simply laid on one surface within mass 12. Another suitable arrangement involves providing a thin-walled graphite cylinder to hold and support the crystal within the mass 12. A space 14 along the surface 16 of the crystal 10, which is the surface where diffusion is to take place, is provided. In other words, the crystal 10 and mass 12 are so arranged that one surface of the crystal is not in contact with any of the mass 12. This is to permit a carrier gas that contains the doping impurity to come into contact with that surface so that the impurity can diffuse into the crystal. As shown, mass 12 completely surrounds the crystal. The end section 12*a* of mass 12 is relatively thin and porous to insure that the carrier gas can infiltrate through to the crystal.

The furnace 13 suitably is designed to permit access to any given portion of it. Since the mass 12 is not destroyed in a single run of this process, it is convenient to use it a plurality of times without changing that mass. Hence, for this purpose a cover 15 that will permit access to the central portion of the furnace where the single crystal is resident is provided. The opening can be large enough to remove all, or part, of mass 12 if that is necessary or desirable. When a new crystal is to be inserted, that can be accomplished, without having to rebuild the entire structure within the furnace, simply by using the opening at 15.

Surrounding the furnace 13 that contains mass 12 and the single crystal 10 is a heating means 22. The heating means shown in this and the other drawings is diagrammatic. It should be understood that the heater is of a size and shape and is so positioned that it will prevent cold areas from developing in the furnace. While the heating means is shown to be external of the furnace, internal heating means suitably lined to prevent damage can be used just as readily. The heating means 22 is so disposed with respect to the crystal 10 that a radial temperature gradient (from hot to cold) from the heater to the crystal is provided. Accordingly, the mass of silicon and carbon, or other material as above described, surrounding the crystal will be at a temperature higher than that of the crystal. This provides a vapor of silicon carbide surrounding crystal 10 which functions to prevent undue decomposition of the crystal. If the crystal temperature were higher than that of the mass 12, it is evident that the crystal would decompose at these high temperatures. Hence, as a consequence of the vapor produced under this gradient, decomposition of the single crystal is significantly retarded and may be substantially prevented. It should be noted, however, that a large gradient preferably is avoided. A large gradient results in excessive supersaturation of the vapor at the crystal surface thereby causing crystal growth. For this reason only a slight gradient on the order of a few degrees, e.g. 5° C. or so per inch of the diameter of the mass, is used.

The crystal is placed within the mass 12 in a position relative to the temperature gradient to avoid undesirable growth. This can be accomplished by placing the crystal surface, where diffusion is to occur, in a plane perpendicular to a radial plane extending from it to the heater. In the embodiment shown, that surface is along the axis of the generally cylindrical center space within mass 12. If desired, the crystal can be slightly tilted from the position shown for the same purpose, since no crystal axis will then be aligned in a manner that would be convenient for crystal growth. The use of a graphite cylinder to hold the crystal also aids in this object since the cylinder can influence the temperature gradient.

A conduit 24 extending into the furnace 13 is provided so that a doping impurity can be introduced into the system. The conduit has an enlarged area 28 to which access is gained through a cap 30 in its top. Within the enlarged area 28 is placed a container 31 having the desired doping impurity 32 therein. The container is made of a material that will resist attack by the doping impurity used. For example, when aluminum is the impurity, a container formed of boron nitride can be used. Surrounding the conduit including its enlarged area and extending to within the range of heating means 22 is a second heating means 26. This heating means is provided so that the temperature of the impurity can be controlled. Since the vapor pressure of a material is a function of its temperature, it is apparent that the heating means 26 can be used in providing the desired impurity concentration. Carrier gas such as argon, helium or other gas inert to the crystal and including mixtures of gases, is introduced through conduit 24 and entrains the impurity vapor as it passes over container 31. The impurity concentration at the crystal is determined by the temperature of the impurity in container 31 along wih the rate of flow of the carrier gas.

While the embodiment of FIG. 1 shows the doping impurity external of the furnace, it should be understood that other arrangements can be used. For example, a furnace divided into a hot zone and a cooler zone can be used with the impurity placed in a boat or similar means in the cooler zone. The circulation of the carrier gas from the cooler to the hotter zone entrains the impurity to the crystal in order that diffusion will occur.

In operation of this system, the temperature of the silicon carbide single crystal is raised to the diffusion temperature, for example 1400° to 2000° C. or more, depending on the impurity that is to be used. As this temperatures is attained in the crystal, a vapor pressure of silicon carbide, silicon and carbon is generated from the mass of silicon carbide surrounding the crystal. Since the surface temperature of the crystal is slightly lower than the temperature of the mass, the crystal temperature will control and will result in essentially an equilibrium vapor pressure of silicon carbide in contact therewith.

An atmosphere of inert carrier gas is then introduced into the system. As the gas passes over the doping impurity 31, which is heated to a temperature, by means 26, to provide the predetermined impurity concentration, it entrains the impurity vapor into the furnace. The carrier gas and impurity vapor are directed over the crystal surface where diffusion is to take place. By maintaining the vapor in contact with the crystal until sufficient diffusion has occurred, a junction is produced in the crystal. Excess impurity that does not enter the crystal generally condenses and is collected on buffer plates (not shown) adjacent cover 15 within the furnace.

The rate of gaseous diffusion into a solid crystal is primarily a function of the concentration of the impurity in the gas phase, the actual impurity involved, the temperature of the crystal and the characteristics of the crystal. Of the foregoing, the crystal temperature and the impurity concentration provide the best means for controlling the rate. In general, the crystal temperature is maintained as low as is convenient to prevent degradation of the electronic properties of the crystal and undue decomposition. Also, the impurity concentration can be adjusted to provide a predetermined impurity distribution.

The crystal temperature generally is maintained in the range of 1400° to 2000° C. or 2100° C. Since a slow reaction is easier to control than a fast one, it is desirable to use as low a crystal temperature as is consistent with securing the desired junction in a reasonable time, e.g. a few hours to 100 or more hours. For example, boron appears to diffuse into silicon carbide very rapidly; therefore a temperature of about 1400° to 1650° C. generally is used. Aluminum on the other hand, generally is used with crystal temperatures of at least about 1700° or 1800° C. and higher. The length of time that diffusion is practiced is, of course, determined by the concentration of the conductivity impurity developed in the doped crystal being treated in addition to the rate of diffusion attained and device design considerations. In other words, diffusion is carried out until the diffusing impurity becomes the conductivity determining impurity in one portion of the crystal where a p-n junction is obtained.

The impurity that is to be diffused into the silicon carbide single crystal in accordance with this invention can be in elemental, in compound or in alloy form. The materials used, that constitute the active doping portion, are from groups *3a* and *5a* of the periodic table and include boron, aluminum, gallium, indium, phosphorus, nitrogen, arsenic, antimony and compounds of the foregoing such for example, as aluminum chloride, aluminum oxide, aluminum carbide, boron chloride, phosphorus chloride, gallium chloride, silicon nitride, silicon carbide containing a large percentage of aluminum and so on.

Gaseous diffusion in the manner just described has been successfully practiced in a large number of qualitative experiments.

For example, aluminum has been diffused into n-type crystals under a variety of conditions. Conventionally, the aluminum is melted to provide its vapor and is held at a temperature of 1200° to 1600° C., and usually at about 1400° C. The crystal temperature has ranged from about 1800° to 2100° C. and these conditions have been maintained for 40 to 100 hours. Examination of the crystals has shown that diffusion of aluminum into the crystals occurred to a depth as low as one-half mil (0.0005 inch) and as high as 2 mils (0.002 inch) at a crystal temperature of 1800° C. and an aluminum temperature of 1400° C. These different penetrations have been obtained in the same length of time in different instances, a result attributed to the different degrees of perfection in the crystals used. Tests show that the resulting junctions have good rectification characteristics.

While the invention as above described used a doping impurity that was admitted by means of a carrier gas, it should be apparent that other ways of providing a doping impurity can be used. For example, the mass 12 that serves to provide a silicon carbide vapor may itself contain the impurity. Upon heating that mass, a vapor pressure of the impurity will be produced and can diffuse into the crystal. However, there being no practical means of controlling the temperature of the impurity, and therefore its vapor pressure, separately from that of the mass, it is difficult to control diffusion by the concentration of the impurity when it is disposed in the mass about the crystal.

It should also be apparent to those skilled in the art that the procedure as set forth above can be used to provide the first conductivity determining impurity in the crystal. After that impurity has been introduced, a second impurity of a conductivity opposite to that of the first impurity, can then be diffused as above disclosed. Hence, it is possible to use an undoped crystal in lieu of a doped crystal in practicing the invention. The same procedure can also be used to provide specific junctions, the characteristics of which are determined by design considerations. It may be desired to form a junction containing a crystal having consecutive layers that are predominantly p type then n type followed by p type again. This can be accomplished simply by changing the type of impurity being diffused at any given time and continuing diffusion until the desired distribution of the impurity results.

Figure 2:
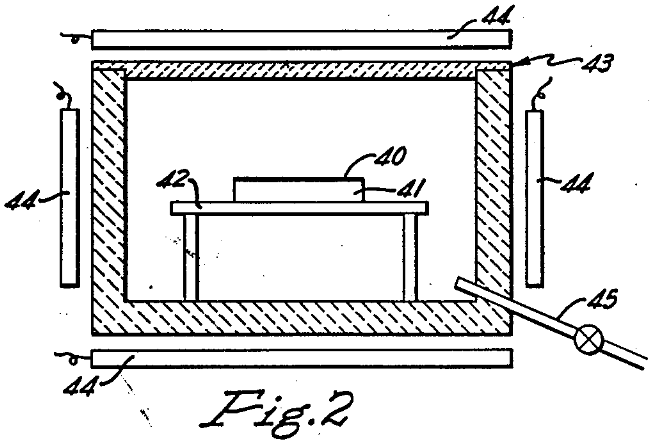
FIG. 2 shows a system whereby solid-to-solid diffusion can be practiced.

Diffuced junctions can also be produced in accordance with the present discoveries by what can be termed solid-to-solid diffusion. This can be illustrated in accordance with FIGURE 2.

In the solid-to-solid diffusion process, a thin wafer 40 of an alloy that includes the desired doping impurity along with a material, e.g. silicon, to prevent decomposition of the crystal, and a metal that forms an alloy or solid solution with silicon carbide at a temperature above the diffusing temperature for the impurity used, is placed on the surface of a silicon carbide single crystal 41 in which a junction is to be formed. The doping material used is of a conductivity type opposite to that of the doping material already in the crystal where a p-n junction is being formed. The alloy wafer and the single crystal should have good contact along the contiguous surfaces. For this purpose, it is convenient to keep these components under homogeneous pressure.

The alloy wafer 40 and crystal 41 are placed on a supporting rack 42 in a furnace 43 provided with a heating means 44 capable of producing a high temperature, for example, as high as 2400° C., at the crystal. The heater shown is diagrammatic; it should be understood that a heater is used that will prevent cold spots from occurring in the system. Conduit 45 is provided to introduce inert gases, such as helium, argon and the like as well as mixtures of gases, as desired.

In practicing this process, the temperature of the crystal and alloy wafer, while they are pressed together, is raised sufficiently high to melt the alloy while in the presence of a high pressure inert atmosphere. In general, high pressure will retard, to a degree, the decomposition of silicon carbide, will raise its sublimation point and will increase the efficiency of alloying and diffusion. Promptly after the wafer is alloyed with silicon carbide, the temperature is lowered to the predetermined diffusion temperature. This latter temperature is low enough to cause molten alloy wafer along with silicon carbide dissolved therein to solidify. The temperature then is maintained at the diffusion level and the impurity in the alloying material diffuses into the crystal. This condition is maintained until the desired diffusion has been obtained to provide a rectifying junction or other desired condition in the crystal.

The diffusion occurring in this embodiment is solid-to-solid state diffusion. The rate of diffusion from a solid phase is determined by the same factors indicated above in connection with the gas phase diffusion. Of course, the pertinent impurity concentration here is that in the solid alloy rather than its vapor phase concentration.

A problem encountered in this embodiment not present in gas diffusion is the diffusion of the alloy itself into the crystal. Indeed, if the alloy diffuses faster than the impurity, it is evident that there will be difficulty in obtaining a junction. Accordingly, when the component that serves to form the alloy with silicon carbide is chosen, the factors of its rate of diffusion relative to that of the diffusing impurity as well as the need to permit alloying to occur at temperatures above the diffusing temperature for the impurity, and generally within the range of about 2000° to 2400° C., are considered.

Typical alloy wafer compositions that are used include mixtures of (1) tungsten, boron and silicon; (2) tungsten, phosphorus and silicon; (3) platinum, boron and silicon; (4) platinum, aluminum and silicon; (5) palladium, aluminum and silicon; and (6) platinum, antimony and silicon. Other compositions can be used; however, components should be chosen that do not form compounds with the diffusing impurity under the conditions of the process such that the impurity is prevented from diffusing into the crystal. It should also be understood that true alloys need not be used; solid mixtures pressed to provide handling strength are satisfactory.

The relative amount of each material in the alloy wafer is adjusted in accordance with the considerations noted above. For example, sufficient silicon is used in the alloy to suppress decomposition of the crystal during the process. Silicon also serves to wet the crystal so that alloying can occur; platinum also can be used for wetting purposes. The conductivity impurity is present in an amount sufficient to secure the desired distribution at the diffusion temperature. The other component or components, which serve to alloy with SiC and to provide the 2000° to 2400° C. melting point, constitute the remainder of the alloy wafer. In providing the various components for the alloy wafer, it should be noted that the impurity used should have a higher diffusion constant than any of the other materials present. As an example of a typical composition where it is desired to diffuse at 1700° C. and alloy at not over about 2350° C., an alloy wafer containing, by weight, about one to three percent of silicon, 2 to 5 percent of aluminum and the balance tungsten can be used and the diffusion constant of aluminum in these circumstances is adequate to result in its diffusion into the crystal.

Another consideration that is of importance in this embodiment of the invention involves the coefficient of thermal expansion of the alloy resulting after the wafer is melted and the melt is solidified. This should be chosen to match that of the silicon carbide as nearly as practical to minimize strains, as a consequence of differential rates of expansion, in the resulting crystal. For the same reason, it is desirable to make the alloying layer as thin as possible and to use constituents characterizing the resulting alloy with ductility. No matter how thin that layer is, it will be a convenient place to attach electrical leads, as by pressure bond contact or high temperature soldering, to the resulting junction-containing crystal. These leads can be in the form of wires for low current operation or in the form of large area plates for high current operation.

In practicing solid-to-solid diffusion as above described, it is advantageous to heat the single crystal with the wafer in place to a moderately elevated temperature prior to the alloying step. In general, the crystal and wafer are first heated below the alloying temperature under a high vacuum for a period of time. After being flushed with hydrogen, helium, argon or the like several times, the alloying step as described above can be initiated.

Typical impurities that can be used in the alloying wafer for purposes of the above embodiment of the invention are the elements from group 3*a* and group 5*a* of the periodic table and include, by way of example, aluminum, antimony, boron, arsenic, phosphorus and the like. The most convenient material to use for purposes of suppressing crystal decomposition is silicon. The additives most generally used for alloying, temperature control, to wet the crystal, and to suppress alloy penetration include tungsten, platinum, palladium and similar high melting point metals i.e. solid during diffusion.

The solid-to-solid diffusion process as just described has been practiced a number of times, in a qualitative manner, to provide information that can lead to utilization in commercial operations. For example in one series of tests, an alloying powder mixture containing, by weight, 1 to 3 percent of silicon, 2 to 5 percent of boron, and the remainder tungsten, was used. A 10 mil thick n-type silicon carbide crystal, having a layer of the foregoing powders on a surface, was heated to about 2200° C., in an atmosphere of argon. After a few minutes at 2200° C., during which time the resulting molten tungsten dissolved the boron and some silicon carbide from the crystal surface, the temperature was lowered to 1650° C. and maintained there for one hour. At 1650° C. the tungsten mixture was solid. At the end of this period, the crystal was removed and examined and found to have been converted entirely to p type as a consequence of boron diffusion therein.

Diffusion of a significant conductivity impurity into a silicon carbide single crystal of the opposite conductivity type to obtain a rectifying junction also can be accomplished from a liquid phase as a consequence of the present discoveries. In essence, this depends on enveloping the crystal in a liquid material that includes the doping impurity and an agent to suppress crystal decomposition, while preventing actual contact between the enveloping material and the single crystal. This can be practiced with the system shown in FIG. 3.

Figure 3:
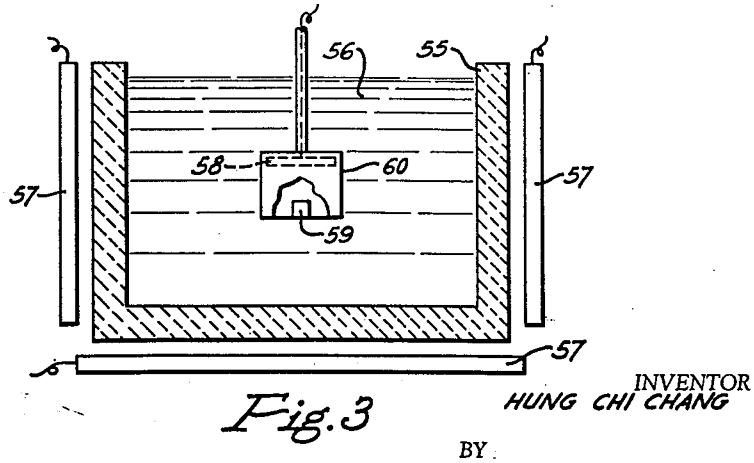
FIG. 3 shows diagrammatically, a system whereby diffusion from a liquid phase into a silicon carbide crystal can be practiced.

Referring now to FIG. 3, a container 55 made, for example, of a ceramic or other material capable of retaining a melt 56 at high temperature is provided. A heating means 57 to maintain the temperature of the melt 56 at the desired level is disposed about container 55. The doped silicon carbide crystal 59 that is to be treated is disposed in a closed container 60 and is submerged in the melt 56 so that the latter completely surrounds the crystal. Container 60 is porous to the impurity vapor and can be composed of such materials as graphite, alundum, boron nitride and the like. A second heating means 58, such as an induction heater, is provided to raise the temperature of the crystal 59 to the temperature at which diffusion is to take place.

As in the embodiment just discussed, the alloy melt includes silicon to provide a vapor to retard the crystal decomposition, the diffusing impurity and, if needed, a material to characterize the melt with a suitable melting point. Similarly to the solid-to-solid diffusion process, the materials are chosen so that the desired impurity can diffuse into the crystal in preference to any other material present. The concentrations of these materials are chosen with the view to securing the necessary vapor pressures, i.e. that of the silicon and that of the impurity. Typical melts that can be used include, by weight, 5 percent of silicon, 1 to 2 percent of aluminum and the balance germanium. Mixtures of platinum, silicon and aluminum or other doping impurity could be used as well as III–V compounds that are mixed with silicon such, for example, as a mixture of gallium phosphide and silicon.

In practicing this embodiment, the alloy melt is heated to the temperature calculated to provide the predetermined concentration of the conductivity impurity. The crystal, disposed in its container and heated to the diffusing temperature, is then submerged in the melt. The container serves to keep the melt away from direct contact with the crystal. It also provides a space about the crystal. The vapors of the conductivity impurity and the silicon penetrate or diffuse through the wall of the container 60 into the space about the crystal. The conductivity impurity will then diffuse into the crystal while the silicon vapor will suppress crystal decomposition essentially as described in connection with the gaseous diffusion process discussed hereinbefore.

While this embodiment involves diffusion into a crystal from a liquid bath, it is evident that the actual diffusion takes place from the gas phase, i.e. the gas or vapor that surrounds the crystal in the container. It should also be noted that it is not absolutely essential to operation of the process that two separate heaters be used. By using a bath that can be heated to the diffusion temperature, i.e. 1400° to 2000° C., a single heater can be used since the bath and crystal can be maintained at the same temperature. When sufficient diffusion has occurred, the crystal and container can be withdrawn.

From the foregoing discussion it is apparent that the present invention is a novel advance in the silicon carbide semiconductor art. By these discoveries, conductivity impurities can be diffused into single crystals substantially at will to produce crystals with predetermined conductivity characteristics.

In accordance with the provisions of the patent statutes, the principle of this invention has been explained and there have been described what are now considered to represent its best embodiments. However, it should be understood that the invention can be practiced otherwise than as specifically described.

I claim as my invention:

1. A method of providing a silicon carbide single crystal with a conductivity impurity diffused therein that comprises subjecting the surface of a silicon carbide single crystal of predetermined shape to contact with a conductivity impurity under conditions of temperature of at least about 1400° C. and a doping impurity concentration for a period of time to cause diffusion of said impurity into a substantial depth into said crystal while maintaining the surface of said crystal out of contact with any molten material but in the presence of a material capable of suppressing decomposition of said crystal whereby to maintain said predetermined shape.

2. A method of forming a junction in a silicon carbide single crystal comprising surrounding a first conductivity type silicon carbide single crystal of predetermined shape with a mass of material capable of providing silicon carbide vapor during subsequent heating, heating said resultant system to provide a temperature gradient extending, from hot to cold, from said mass of material to said silicon carbide single crystal and to heat said single crystal to a diffusion temperature of at least about 1400° C., and contacting for a period of time a surface of said silicon carbide single crystal with a gaseous doping impurity of the opposite type conductivity from said first conductivity type whereby said doping impurity diffuses a substantial distance into the surface of said crystal.

3. A method of forming a junction in a silicon carbide single crystal comprising heating a first conductivity type silicon carbide single crystal of predetermined shape disposed in a mass of material capable of providing silicon carbide vapor to generate such a vapor in equilibrium with said crystal and to heat said crystal to a diffusion temperature of at least about 1400° C., passing an inert carrier gas over a doping impurity of a conductivity type opposite to that of said doped crystal maintained at an elevated temperature but below that of said crystal, whereby a vapor of said doping impurity at a predetermined concentration is produced in said carrier gas, and then passing for a period of time the resulting mixture of carrier gas and doping impurity into contact with said crystal to diffuse said doping impurity a substantial distance into the surface of the crystal.

4. A method of forming a junction in a silicon carbide single crystal comprising melting on a surface of a first conductivity type silicon carbide single crystal a mixture, capable of alloying with silicon carbide, containing a doping impurity of a conductivity type opposite to said first conductivity type, silicon in an amount sufficient to prevent deleterious decomposition of said silicon carbide single crystal and a melting point regulating material that characterizes an alloy thereof with silicon carbide with a melting point above the desired diffusion temperature of said doping impurity into said crystal and below about 2500° C., then lowering the temperature to the desired diffusion temperature to solidify the resulting melt on said crystal and produce thereon a solid alloy including silicon carbide, and maintaining said diffusion temperature for a prolonged period of time to diffuse said doping impurity into said crystal a substantial depth below the alloy layer.

5. A method of forming a diffused junction in a silicon carbide single crystal which comprises providing a liquid that contains a first conductivity type doping impurity and silicon at an elevated temperature, submerging in said liquid a silicon carbide single crystal that is doped with a conductivity type impurity of opposite conductivity from said first conductivity type doping material and that is heated to a diffusion temperature while maintaining said single crystal out of actual contact with said liquid, whereby a vapor of said first conductivity type doping material is provided in the resulting space between said crystal and said liquid and can diffuse a selected depth into the surface of said crystal.

References Cited in the file of this patent

UNITED STATES PATENTS

| | | |
|---|---|---|
| 2,703,296 | Teal | Mar. 1, 1958 |
| 2,854,364 | Lely | Sept. 30, 1958 |
| 2,873,222 | Derick | Feb. 10, 1959 |
| 2,918,396 | Hall | Dec. 22, 1959 |

OTHER REFERENCES

Semiconductor Abstracts, vol. IV, 1956, page 174, abstract No. 579.